United States Patent
Guo et al.

(10) Patent No.: US 9,319,513 B2
(45) Date of Patent: Apr. 19, 2016

(54) AUTOMATIC UN-MUTING OF A TELEPHONE CALL

(75) Inventors: Shang Q. Guo, Cortland Manor, NY (US); Paul J. Landsberg, Raleigh, NC (US); Jonathan Lenchner, North Salem, NY (US); Maharaj Mukherjee, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 827 days.

(21) Appl. No.: 13/547,379

(22) Filed: Jul. 12, 2012

(65) Prior Publication Data
US 2014/0015952 A1 Jan. 16, 2014

(51) Int. Cl.
| H04N 7/15 | (2006.01) |
| H04N 7/18 | (2006.01) |
| H04M 3/42 | (2006.01) |
| H04M 1/60 | (2006.01) |
| H04M 1/03 | (2006.01) |

(52) U.S. Cl.
CPC ........... *H04M 3/42* (2013.01); *H04M 1/6008* (2013.01); *H04N 7/18* (2013.01); *H04M 1/03* (2013.01); *H04M 2250/52* (2013.01); *H04M 2250/62* (2013.01)

(58) Field of Classification Search
CPC ....... H04M 1/03; H04M 1/6008; H04M 3/42; H04N 7/18
USPC ........... 348/78, 77, 14.08; 379/207.02, 201.1, 379/202.01, 388.02, 420.02, 431, 433.03; 455/416; 381/26, 91, 92, 122
See application file for complete search history.

(56) References Cited

U.S. PATENT DOCUMENTS

| 4,594,591 | A | 6/1986 | Burke | 340/825.07 |
| 6,675,002 | B1 | 1/2004 | Lipovski | 455/194.1 |
| 8,031,853 | B2 | 10/2011 | Bathurst et al. | 379/202.01 |
| 8,041,768 | B2 | 10/2011 | Wu et al. | 709/206 |
| 8,059,807 | B2 | 11/2011 | Gilbert et al. | 379/202.01 |
| 8,064,595 | B2 | 11/2011 | Brown et al. | 379/421 |
| 8,862,104 | B2 * | 10/2014 | Mian et al. | 455/414.1 |
| 2010/0067680 | A1 | 3/2010 | Hanson et al. | 379/202.01 |
| 2010/0142721 | A1 | 6/2010 | Wada et al. | 381/77 |
| 2011/0103577 | A1 | 5/2011 | Poirier | 379/420 |

OTHER PUBLICATIONS

Kashorda et al., "Capacity of cordless telephone systems, with discontinuous transmission," Electronics Letters, vol. 27, Issue: 10 (1991).

* cited by examiner

*Primary Examiner* — Jeffeney Harold
*Assistant Examiner* — Jean W Desir
(74) *Attorney, Agent, or Firm* — Ryan, Mason & Lewis, LLP

(57) ABSTRACT

Methods and apparatus are provided for automatic un-muting of a telephone call. A muted telephone of a user is automatically un-muted during a telephone call by evaluating whether the user is facing the telephone while speaking during the telephone call. The telephone can optionally be automatically muted when the user stops speaking and is not facing the telephone. A telephone call of a user can also be processed by evaluating whether the user is facing the telephone while speaking during the telephone call; and providing a message to the user indicating that the telephone is muted if the user is facing the telephone while speaking during the telephone call.

20 Claims, 5 Drawing Sheets

*FIG. 1A*
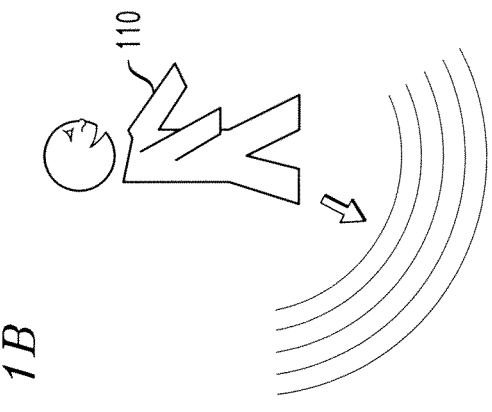
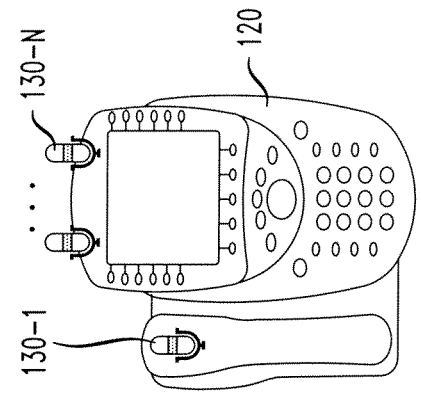
*FIG. 1B*
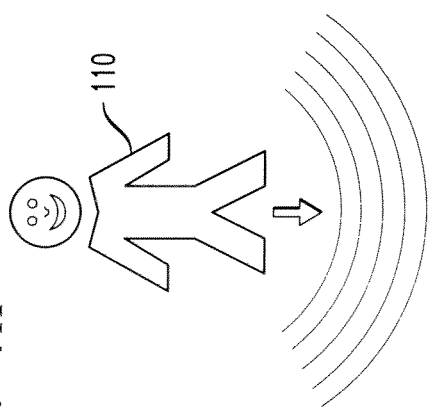
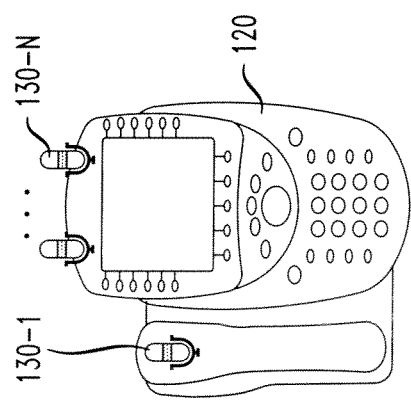

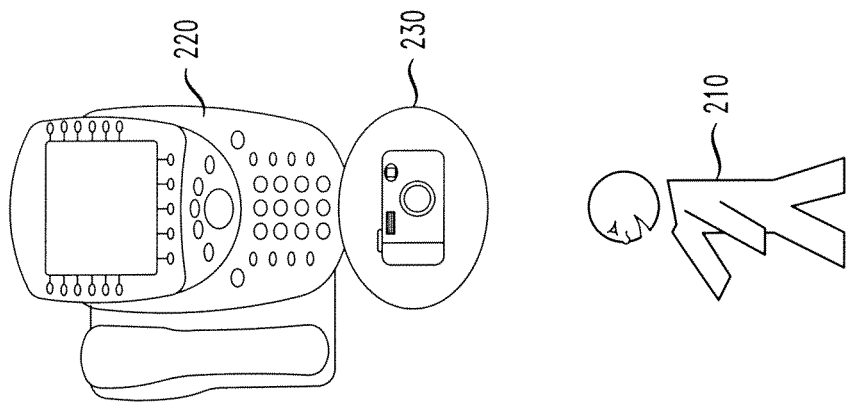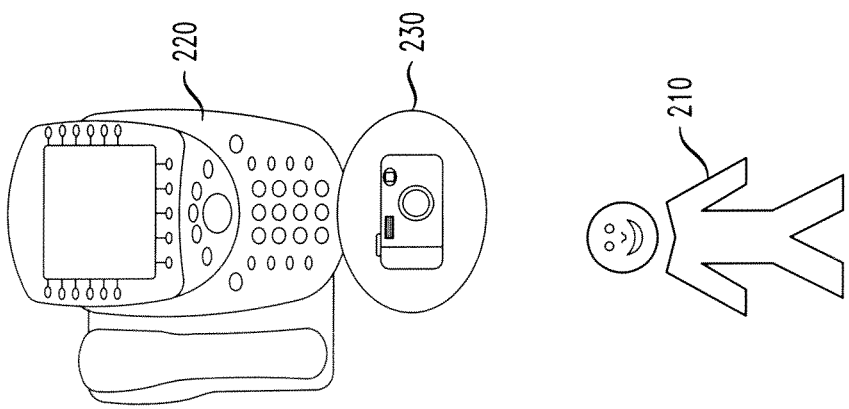

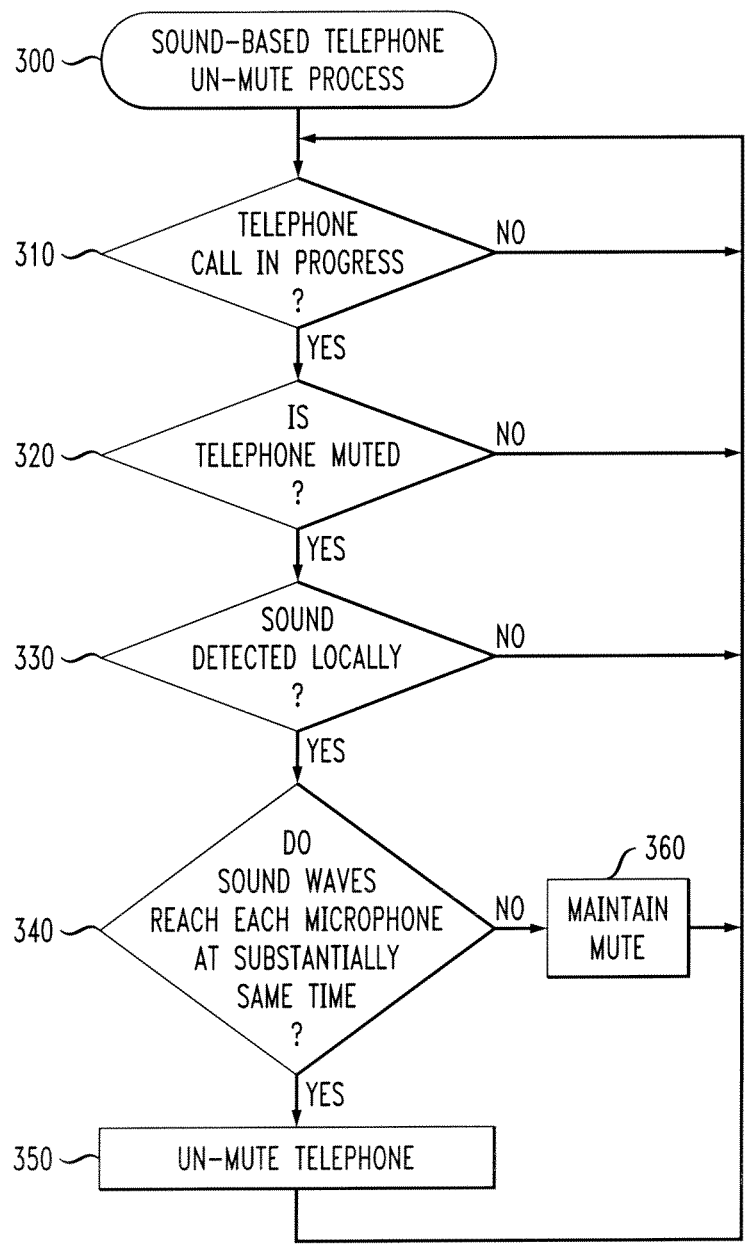

AUTOMATIC UN-MUTING OF A TELEPHONE CALL

FIELD OF THE INVENTION

The present invention relates to techniques for un-muting a telephone call.

BACKGROUND OF THE INVENTION

Participants of a conference call often mute their telephone during the conference call for privacy or to ensure that background noise from the local environment does not interrupt the conversation. After muting the telephone, however, the participant may forget that the telephone has been muted and begin talking without un-muting the telephone. The participant often ends up "talking to mute" for some length of time.

A number of techniques have been proposed or suggested for muting or un-muting a telephone. For example, some conference call systems selectively mute the telephone of a participant in a conference call who is making noise that is disruptive or distracting to the other participants of the call. In addition, some mobile telephones allow a user to set a timeout period for a mute command, after which time the mute command is automatically reversed and the telephone is un-muted. While such timeout techniques have reduced the likelihood that a user will begin talking while a telephone is still muted, it is difficult for the user to accurately predict how long the timeout period should be set for.

A need therefore remains for improved techniques for automatically un-muting a telephone during a conference call.

SUMMARY OF THE INVENTION

Generally, methods and apparatus are provided for automatic un-muting of a telephone call. According to one aspect of the invention, a muted telephone of a user is automatically un-muted during a telephone call by evaluating whether the user is facing the telephone while speaking during the telephone call based on processing of one or more of speech and images of the user; and automatically un-muting the telephone if the user is facing the telephone while speaking during the telephone call.

The evaluation of whether the user is facing the telephone can comprise, for example, evaluating sound waves and/or a facial pose of the user. The sound waves of the user can optionally be processed to determine whether the sound waves reach a plurality of microphones associated with the telephone at substantially the same time. The facial pose of the user can optionally be processed to determine whether a nose and/or both eyes of the user are substantially visible as a front-facing view in images generated by a camera associated with the telephone. A score can optionally be assigned to the facial pose of the user indicating a degree to which the user is facing the telephone.

The telephone can optionally be automatically muted when the user stops speaking and is not facing the telephone. In another variation, the automatic un-muting of the telephone in accordance with the present invention can optionally be disabled if the telephone is in a hard-mute mode.

According to a further aspect of the invention, a telephone call of a user is processed by evaluating whether the user is facing the telephone while speaking during the telephone call based on processing of one or more of speech and images of the user; and providing a message to the user indicating that the telephone is muted if the user is facing the telephone while speaking during the telephone call.

A more compete understanding of the present invention, as well as further features and advantages of the present invention, will be obtained by reference to the following detailed description and drawings.

BRIEF DESCRIPTION OF THE DRAWINGS

FIGS. 1A and 1B illustrate an exemplary conference call system of a user in accordance with a first exemplary embodiment of the invention;

FIGS. 2A and 2B illustrate an exemplary conference call system of a user in accordance with a second exemplary embodiment of the invention;

FIG. 3 is a flow chart describing an exemplary implementation of a sound-based telephone un-mute process, incorporating aspects of the present invention;

DETAILED DESCRIPTION OF PREFERRED EMBODIMENTS

Figure 4:
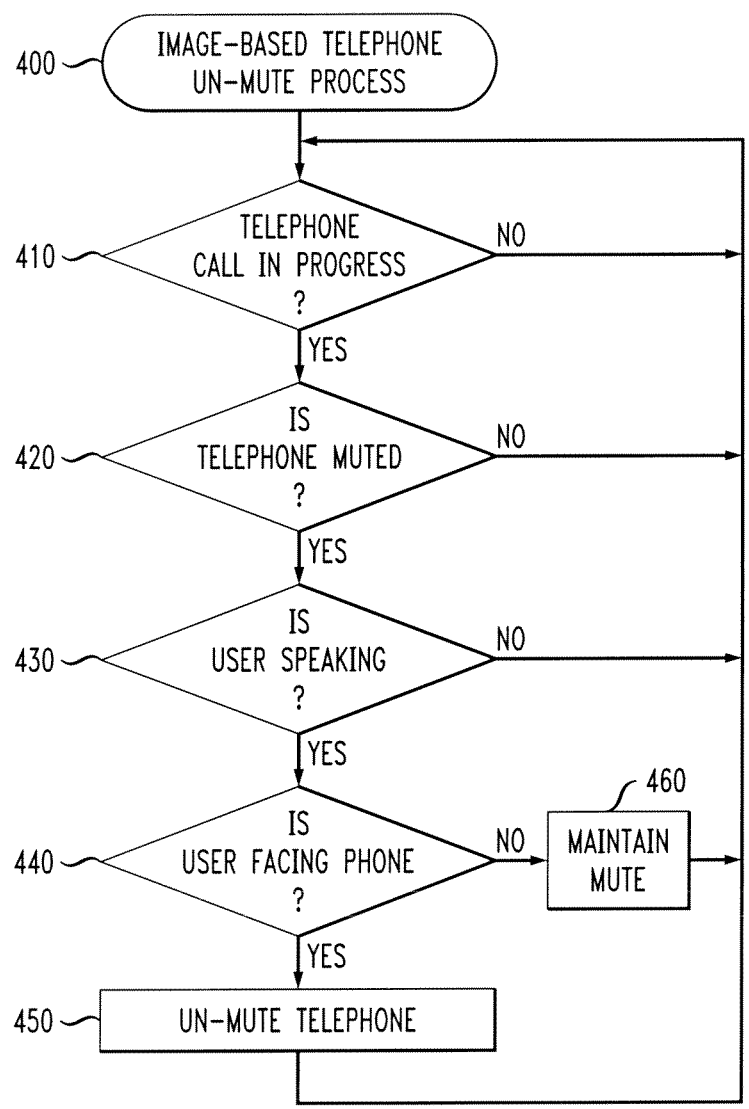
FIG. 4 is a flow chart describing an exemplary implementation of an image-based telephone un-mute process, incorporating aspects of the present invention.

The present invention provides methods and apparatus for automatically un-muting a telephone during a conference call. According to one aspect of the invention, the telephone is automatically un-muted when a user is facing the direction of the telephone while speaking. As discussed hereinafter, in various embodiments, sound and/or image processing techniques can be used to determine whether the user is facing the direction of the telephone while speaking.

The present invention recognizes that if a user is facing the direction of the telephone while speaking, the user typically intends for the speech to be part of the conference call (and the telephone should be un-muted). If the user is not facing the direction of the telephone while speaking, the user is typically speaking to another person in the vicinity of the user and does not intend for the speech to be part of the conference call (and the telephone should be muted).

In a first exemplary embodiment, the telephone comprises a plurality of spatially separated microphones to determine if the user is speaking (e.g., sounds waves are detected) and facing the telephone (e.g., the sounds waves reach each of the spatially separated microphones at substantially the same time). The microphones can be integrated with the telephone or positioned in the vicinity of the telephone. Generally, if the user is directly facing the telephone, the various microphones will detect the sound waves emitted by the voice of the user at approximately the same time. Likewise, if the user is not looking directly at the telephone, the closest microphone will detect the sound waves emitted by the voice of the user, followed successively in sequence by the next closest microphone.

In an embodiment where the determination of whether the user is facing the telephone is based on an evaluation of sound waves, the term "substantially" is a function of the distance separating the microphones that capture the sound waves. Sound waves travel at approximately 1.000 ft/sec or 12,000 inches/sec. Thus, if the microphones are 3 inches apart and a first microphone is closer. to the speaker, and the speaker is facing in an oblique angle to the telephone, the sound waves will reach the second microphone approximately 1/4000 second after the sound waves reach the first microphone (3*(1/

12,000)). Thus, for an exemplary microphone separation of 3 inches, a user is "substantially facing" the telephone when the sound waves reach the two microphones within a time difference which is an order of magnitude less than this, i.e., 1/40,000 second or less.

In a second exemplary embodiment, the telephone comprises one or more cameras to determine if the user is speaking (e.g., the lips of the user are moving) and facing the telephone (e.g., using image processing of the facial pose). The camera(s) can be integrated with the telephone or positioned in the vicinity of the telephone. In such an embodiment where the determination of whether the user is facing the telephone is based on image processing to determine a facial pose of the user, a predefined criteria can be established to define when a user is "facing" the telephone. For example, the predefined criteria can require that a certain percentage of the nose of the user is visible in the generated images and/or that a certain percentage of one or both eyes of the user are visible in the generated images. In another variation, the predefined criteria can be based on a measured orientation of the facial pose of the user. For example, a score can be assigned to the facial pose of the user indicating a degree to which the user is facing the telephone. The facial pose score can be compared to a corresponding threshold to determine if the user is facing the telephone. In yet another variation, a predefined gesture can be established to confirm that the user is facing the telephone.

FIGS. 1A and 1B illustrate an exemplary conference call system of a user 110 in accordance with a first exemplary embodiment of the invention. As shown in FIGS. 1A and 1B, a telephone 120 of the user 110 comprises a plurality of spatially separated microphones 130-1 through 130-N. The microphones 130 can be integrated with the telephone 120 or positioned in the vicinity of the telephone 120. The microphones 130 are used to determine if the user 110 is speaking (e.g., sounds waves are detected) while the user 110 is facing the telephone 120 (e.g., the sounds waves reach each of the spatially separated microphones 130 at substantially the same time). Generally, if the user 110 is directly facing the telephone 120, the various microphones 130 will detect the sound waves emitted by the voice of the user 110 at approximately the same time. Likewise, if the user 110 is not directly facing the telephone 120, the closest microphone 130 to the user 110 will initially detect the sound waves emitted by the voice of the user 110, followed successively in sequence by the next closest microphone 130 and so on.

The exemplary telephone 120 can employ an exemplary sound-based telephone un-mute process 300 (discussed further below in conjunction with FIG. 3) to determine if the user 110 is speaking while looking at the telephone 120.

FIGS. 2A and 2B illustrate an exemplary conference call system of a user 210 in accordance with a second exemplary embodiment of the invention. As shown in FIGS. 2A and 2B, a telephone 220 of the user 210 comprises one or more cameras 230. The cameras 230 can be integrated with the telephone 220 or positioned in the vicinity of the telephone 220. The cameras 230 are used to determine if the user 210 is speaking (e.g., the users lips are moving) while the user 210 is facing the telephone 220 (e.g., using image processing to determine the facial pose of the user 210). Generally, if the user 210 is directly facing the telephone 220, the nose of the user 210 and/or both eyes of the user 210 will be visible in the images generated by the camera(s) 230. Likewise, if the user 210 is not facing the telephone 220, the full nose of the user 210 and/or both eyes of the user 210 will not be visible in the images generated by the camera(s) 230.

The exemplary telephone 220 can employ an exemplary image-based telephone un-mute process 400 (discussed further below in conjunction with FIG. 4) to determine if the user 210 is speaking while looking at the telephone 220.

FIG. 3 is a flow chart describing an exemplary implementation of a sound-based telephone un-mute process 300, incorporating aspects of the present invention. As previously indicated, the sound-based telephone un-mute process 300 automatically un-mutes a muted telephone 120 if the user 110 is speaking while looking at the telephone 120. Generally, if the user 110 is directly facing the telephone 120, the various microphones 130 will detect the sound waves emitted by the voice of the user 110 at approximately the same time. Likewise, if the user 110 is not facing the telephone 120, the closest microphone 130 to the user 110 will initially detect the sound waves emitted by the voice of the user 110, followed successively in sequence by the next closest microphone 130 and so on.

As shown in FIG. 3, the sound-based telephone un-mute process 300 initially performs a test during step 310 to determine if there is a telephone call in progress. If it is determined during step 310 that a telephone call is not in progress, then program control returns to step 310 until a telephone call is in progress.

If, however, it is determined during step 310 that a telephone call is in progress, then a further test is performed during step 320 to determine if the telephone 120 is muted. If it is determined during step 320 that the telephone 120 is not muted, then program control returns to step 310 until the telephone 120 is muted during a telephone call. If, however, it is determined during step 320 that the telephone 120 is muted, then yet another test is performed during step 330 to determine if sound is detected while the telephone is muted. For example, the test performed during step 330 can determine if the magnitude in decibels of the sound waves received by the microphones 130 associated with the telephone 120 exceed a predefined threshold.

If it is determined during step 330 that sound is not detected locally while the phone is muted, then program control returns to step 310 until sound is so detected. If, however, it is determined during step 330 that sound is detected locally while the phone is muted, then another test is performed during step 340 to determine if the initial sound waves reached each microphone 130 at substantially the same time. If it is determined during step 340 that the initial sound waves reached each microphone 130 at substantially the same time, then the telephone 120 is un-muted during step 350.

If, however, it is determined during step 340 that the initial sound waves did not reach each microphone 130 at substantially the same time, then the telephone 120 remains muted during step 360.

Program control returns to step 310 to continue monitoring the sounds waves in the manner discussed above.

The sound-based telephone un-mute process 300 optionally filters out ambient sounds, such as background office noise, sirens going off in the distance or the sounds of a car motor.

FIG. 4 is a flow chart describing an exemplary implementation of an image-based telephone un-mute process 400 incorporating aspects of the present invention. As previously indicated, the image-based telephone un-mute process 400 automatically un-mutes a muted telephone 220 if the user 210 is speaking while facing the telephone 220, as determined by image processing. Generally, if the user 210 is directly facing the telephone 220, the full, head-on view of the nose of the user 210 and/or both eyes of the user 210 will be visible in the images generated by the camera(s) 230. Likewise, if the user 210 is not facing the telephone 220, the nose of the user 210 will jut out from the facial profile and/or both eyes of the user 210 will not be visible in the images generated by the camera(s) 230.

As shown in FIG. 4, the image-based telephone un-mute process 400 initially performs a test during step 410 to determine if there is a telephone call in progress. If it is determined during step 410 that a telephone call is not in progress, then program control returns to step 410 until a telephone call is in progress.

If, however, it is determined during step 410 that a telephone call is in progress, then a further test is performed during step 420 to determine if the telephone 220 is muted. If it is determined during step 420 that the telephone 220 is not muted, then program control returns to step 410 until the telephone 220 is muted during a telephone call. If, however, it is determined during step 420 that the telephone 220 is muted, then yet another test is performed during step 430 to determine if the user 210 is speaking. For example, the test performed during step 430 can determine if the magnitude in decibels of the sound waves received by one or more microphones associated with the telephone 220 exceed a predefined threshold; and/or if the lips of the user 210 are moving in the images generated by the camera(s) 230.

If it is determined during step 430 that the user 210 is not speaking while the telephone is muted, then program control returns to step 410 until it is detected that the user 210 is speaking while the phone is muted. If, however, it is determined during step 430 that the user 210 is speaking while the phone is muted, then another test is performed during step 440 to determine if the user 210 is facing the telephone 220, for example, based on a predefined criteria. For example, the test performed during step 440 can determine the facial pose of the user, e.g., determining whether the nose juts out of the user's facial profile and/or whether just one eye of the user 210 is visible in the images generated by the camera(s) 230. In one exemplary embodiment, a score can be assigned to the facial pose of the user 210 indicating the degree to which the user is facing the telephone 220. The facial pose score can be compared to a corresponding threshold to determine if the user is facing the telephone 220.

For a suitable discussion of techniques for determining the facial pose of the user, see, for example, R. Chellappa at al., "Human and Machine Recognition of Face: A Surf," Proc. of the IEEE, 83(5): 705-740. (1995); A. Nikolaidis and I. Pitas, "Facial Feature Extraction and Determination of Pose," Pattern Recognition, 33: 1783-1791 (2000); and/or U.S. Pat. No. 6,937,745, entitled "Machine Vision System and Method for Estimating and Tracking Facial Pose," each incorporated by reference herein.

If it is determined during step 440 that the user 210 is facing the telephone 220, then the telephone 220 is un-muted during step 450. If, however, it is determined during step 440 that the user 210 is not facing the telephone 220, then the telephone 220 remains muted during step 460.

Program control returns to step 410 to continue monitoring the images in the manner discussed above.

The sound-based telephone un-mute process 300 and the image-based telephone un-mute process 400 can optionally be combined with one another, or with other indicators that the user(s) 110, 210 intends for his or her voice to be heard on the telephone conversation. For example, the user(s) 110, 210 can indicate an intention for his or her voice to be heard on the telephone conversation based on volume or sound-source distance from the telephone(s) 120, 220 (detected, e.g., using the multiple microphone configuration of FIG. 1).

In one exemplary embodiment, if the sound-based telephone un-mute process 300 and/or the image-based telephone un-mute process 400 automatically un-mutes the telephone(s) 120, 220, an alert message can optionally be displayed to the user(s) 110, 210, indicating that the telephone(s) 120, 220 is being un-muted.

In yet another variation, following an automatic un-muting of the telephone 120, 220 in accordance with the present invention, the sound-based telephone un-mute process 300 and/or the image-based telephone un-mute process 400 can optionally detect when the user 110, 210 has stopped speaking and is no longer facing the telephone, to automatically mute the telephone 120, 220.

Another embodiment of the invention allows the user to specify either a "hard-mute" or a "soft-mute." A hard-mute disables the present invention by preventing the telephone(s) 120, 220 from automatically un-muting based on the observations described above, in other words, muting the phone in the way phones are muted today. A soft-mute, on the other hand, enables the present invention by allowing the telephone(s) 120, 220 to automatically un-mute in accordance with aspects of the present invention.

In yet another embodiment of the invention when the phone suspects that the user is speaking with the intention of being heard on the phone (i.e., by incorporating the process 300, or the process 400, minus the actual unmuting step), the phone uses its display to flash a message indicating that it is still on mute.

While FIGS. 3 and 4 show an exemplary sequence of steps, it is also an embodiment of the present invention that these sequences may be varied. Various permutations of the algorithms are contemplated as alternate embodiments of the invention.

While exemplary embodiments of the present invention have been described with respect to processing steps in a software program, as would be apparent to one skilled in the art, various functions may be implemented in the digital domain as processing steps in hardware by a programmed general-purpose computer, circuit elements or state machines, or in combination of both software and hardware. Such software may be employed in, for example, a hardware device, such as a digital signal processor, application specific integrated circuit, micro-controller, or general-purpose computer. Such hardware and software may be embodied within circuits implemented within an integrated circuit.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. . or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
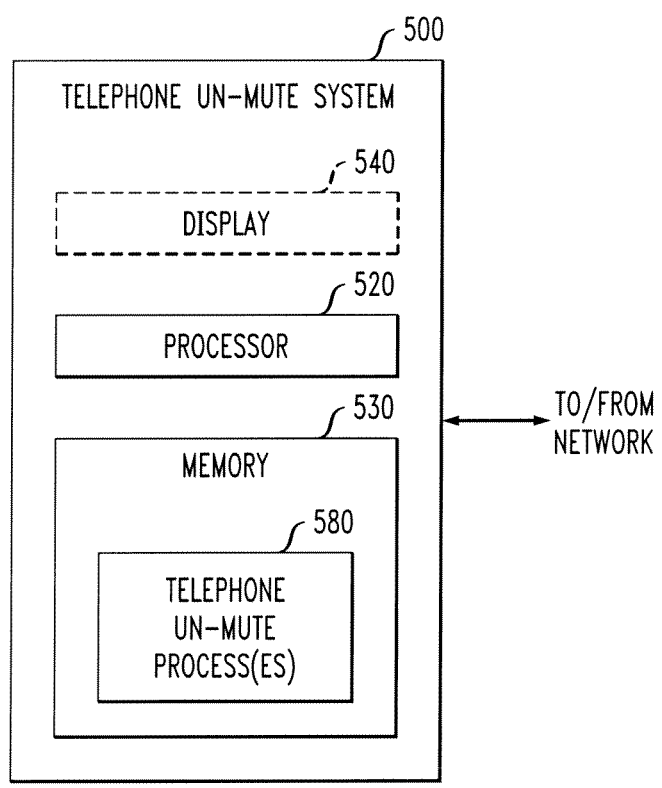
FIG. 5 is a block diagram of a telephone un-mute system that can implement the processes of the present invention.

FIG. 5 is a block diagram of a telephone un-mute system 500 that can implement the processes of the present invention. As shown in FIG. 5, memory 530 configures the processor 520 to implement the telephone un-mute methods, steps, and functions disclosed herein (collectively, shown as 580 in FIG. 5). The memory 530 could be distributed or local and the processor 520 could be distributed or singular. The memory 530 could be implemented as an electrical, magnetic or optical memory, or any combination of these or other types of storage devices. It should be noted that each distributed processor that makes up processor 520 generally contains its own addressable memory space. It should also be noted that some or all of computer system 500 can be incorporated into a personal computer, laptop computer, handheld computing device, application-specific circuit or general-use integrated circuit.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the embodiments and variations shown and described herein are merely illustrative of the principles of this invention and that various modifications may be implemented by those skilled in the art without departing from the scope and spirit of the invention.

What is claimed is:

1. A method for automatically un-muting a muted telephone of a user during a telephone call, comprising:
    evaluating, using at least one processing device, whether said user is facing said telephone while speaking during said telephone call based on processing of speech and images of said user, wherein said step of evaluating whether said user is facing said telephone further comprises evaluating sound waves of said user by determining whether said sound waves reach a plurality of microphones associated with said telephone at substantially the same time; and
    automatically un-muting said telephone, using at least one processing device, if said user is facing said telephone while speaking during said telephone call.

2. The method of claim 1, wherein said step of evaluating whether said user is facing said telephone further comprises evaluating a facial pose of said user.

3. The method of claim 2, wherein said step of evaluating said facial pose of said user further comprises the step of determining whether a nose of said user is substantially visible as a front-facing view in images generated by a camera associated with said telephone.

4. The method of claim 2, wherein said step of evaluating said facial pose of said user further comprises the step of determining whether both eyes of said user are substantially visible in images generated by a camera associated with said telephone.

5. The method of claim 2, wherein said step of evaluating said facial pose of said user further comprises the step of assigning a score to said facial pose of said user indicating a degree to which said user is facing said telephone.

6. The method of claim 1, further comprising the step of automatically muting said telephone when said user stops speaking and is not facing said telephone.

7. The method of claim 1, wherein said step of automatically un-muting said telephone is disabled if said telephone is in a hard-mute mode.

8. A method for processing a telephone call by a user, comprising:
 evaluating, using at least one processing device, whether said user is facing said telephone while speaking during said telephone call based on processing of speech and images of said user, wherein said step of evaluating whether said user is facing said telephone further comprises evaluating sound waves of said user by determining whether said sound waves reach a plurality of microphones associated with said telephone at substantially the same time; and
 providing a message to said user, using at least one processing device, indicating that said telephone is muted if said user is facing said telephone while speaking during said telephone call.

9. An apparatus for automatically un-muting a muted telephone of a user during a telephone call, the apparatus comprising:
 a memory; and
 at least one hardware device, coupled to the memory, operative to:
 evaluate, using at least one processing device, whether said user is facing said telephone while speaking during said telephone call based on processing of speech and images of said user, wherein said step of evaluating whether said user is facing said telephone further comprises evaluating sound waves of said user by determining whether said sound waves reach a plurality of microphones associated with said telephone at substantially the same time; and
 automatically un-mute said telephone, using at least one processing device, if said user is facing said telephone while speaking during said telephone call.

10. The apparatus of claim 9, wherein said evaluation of whether said user is facing said telephone further comprises evaluating a facial pose of said user.

11. The apparatus of claim 10, wherein said evaluation of said facial pose of said user determines whether a nose of said user is substantially visible as a front-facing view in images generated by a camera associated with said telephone.

12. The apparatus of claim 10, wherein said evaluation of said facial pose of said user determines whether both eyes of said user are substantially visible in images generated by a camera associated with said telephone.

13. The apparatus of claim 10, wherein said evaluation of said facial pose of said user assigns a score to said facial pose of said user indicating a degree to which said user is facing said telephone.

14. The apparatus of claim 9, wherein said at least one hardware device is further configured to automatically mute said telephone when said user stops speaking and is not facing said telephone.

15. The apparatus of claim 9, wherein said automatic un-muting of said telephone is disabled if said telephone is in a hard-mute mode.

16. An article of manufacture for automatically un-muting a muted telephone of a user during a telephone call, comprising a tangible machine readable recordable medium containing one or more programs which when executed implement the steps of:
 evaluating, using at least one processing device, whether said user is facing said telephone while speaking during said telephone call based on processing of speech and images of said user, wherein said step of evaluating whether said user is facing said telephone further comprises evaluating sound waves of said user by determining whether said sound waves reach a plurality of microphones associated with said telephone at substantially the same time; and
 automatically un-muting said telephone, using at least one processing device, if said user is facing said telephone while speaking during said telephone call.

17. The article of manufacture of claim 16, wherein said step of evaluating whether said user is facing said telephone further comprises evaluating a facial pose of said user.

18. The article of manufacture of claim 17, wherein said step of evaluating said facial pose of said user further comprises the step of assigning a score to said facial pose of said user indicating a degree to which said user is facing said telephone.

19. The article of manufacture of claim 16, further comprising the step of automatically muting said telephone when said user stops speaking and is not facing said telephone.

20. The article of manufacture of claim 16, wherein said step of automatically un-muting said telephone is disabled if said telephone is in a hard-mute mode.

* * * * *